United States Patent [19]

Groelz

[11] 4,139,018
[45] Feb. 13, 1979

[54] SYSTEM FOR AUTOMATIC FORWARD BOW ALIGNMENT ON WATER DRIVE PIVOT

[75] Inventor: Jay C. Groelz, Phillips, Nebr.

[73] Assignee: Heinzman Engineering, Inc., Grand Island, Nebr.

[21] Appl. No.: 786,668

[22] Filed: Apr. 11, 1977

[51] Int. Cl.² .............................................. B05B 3/12
[52] U.S. Cl. ..................................... 137/344; 239/177
[58] Field of Search ................ 137/344; 239/177, 212, 239/213

[56] References Cited

U.S. PATENT DOCUMENTS

| | | | |
|---|---|---|---|
| 3,628,729 | 12/1971 | Thomas | 137/344 X |
| 3,712,544 | 1/1973 | Ririe et al. | 239/177 |
| 3,780,947 | 12/1973 | Ririe et al. | 137/344 X |
| 3,843,058 | 10/1974 | Koinzan | 137/344 X |

Primary Examiner—Gerald A. Michalsky
Attorney, Agent, or Firm—Clarence A. O'Brien; Harvey B. Jacobson

[57] ABSTRACT

A system for automatic forward bow alignment on a water drive pivot irrigator has a valve assembly associated with each of the towers of the irrigator for regulating movement of the respective tower in a direction of rotation of the irrigator. A flexible element extends along the length of the pipe connecting together the towers of the irrigator for detecting alignment of each of the towers along a desired forward bow of the irrigator and controlling the valve assembly of each of the towers as a function of alignment and misalignment of the particular tower with respect to the desired forward bow. Each valve assembly includes a pair of valves normally held open by a weight mounted on an actuator of the valve, with a reversing lever being connected to the actuator of each of the valves for selectively closing one of the valves while assuring the other of the valves is held in an on position. The flexible cable is also connected to the valve actuators for selectively closing the one of the valve actuators which is in an on position to the closed position thereof in order to stop a tower when same is getting too far ahead of the correct forward bow, while a wind flag is advantageously also connected to the valve actuators and to the flexible element for compensating for the pressure of wind against the flexible element.

12 Claims, 5 Drawing Figures

SYSTEM FOR AUTOMATIC FORWARD BOW ALIGNMENT ON WATER DRIVE PIVOT

BACKGROUND OF THE INVENTION

1. Field of the Invention

This invention relates generally to new and useful improvements in area watering systems wherein a tower supported water pipe travels in a circular path about a central supply point, and particularly to an automatic forward bow alignment system for keeping the towers of such a watering system in proper position with respect to one another.

2. Description of the Prior Art

It is known in the irrigation industry that water-turbine drive pivots must never be operated with a reverse bow, because such reverse bow will cause the pipe connecting together the towers of the device to be placed in compression along the forward, or leading, side thereof, which compression will subsequently cause damage to the machine. Thus, it is desirable to operate the pivot with a slight forward bow, because such a bow will cause the main line, or pipe, to be operated while in tension along the forward, or leading, side thereof. Pivot irrigators have more strength in the tension mode than in the compression mode, and have a history of bending main line pipe any time that they are operated in the compression mode. If the pivot is reversible, the forward bow must be established immediately in the opposite direction when the device is reversed.

U.S. Pat. Nos. 3,628,729, issued Dec. 21, 1971 to J. R. Thomas, and 3,599,664, issued Aug. 17, 1971 to K. W. Hotchkiss et al, disclose pivot irrigators in which the towers are controlled so as not to get ahead of a line radiating from a pivot of the apparatus, while U.S. Pat. No. 3,780,947, issued Dec. 25, 1973 to M. H. Ririe et al, discloses a pivot irrigator alignment control which includes the use of a wind vane arranged for compensating for the effect of wind on a control wire which selectively opens and closes switches regulating movement of the apparatus.

SUMMARY OF THE INVENTION

It is an object of the present invention to provide an automatic forward bow alignment system which will permit alignment of the towers of a water drive pivot irrigator in a simple, yet reliable manner.

It is another object of the present invention to provide an automatic forward bow alignment system capable of establishing a forward bow immediately in either direction of rotation of a reversible pivot irrigator.

It is still another object of the present invention to provide an automatic forward bow alignment system for use with a pivot irrigator which compensates for the effects of wind on the system as the irrigator rotates about the pivot thereof.

These and other objects are achieved according to the present invention by providing an automatic forward bow alignment system for a pivot irrigator, which system has: a valve assembly associated with each of the towers of the irrigator for regulating movement of the tower in a direction of rotation of the irrigator; and a sensor provided on the irrigator for detecting alignment of each of the towers of the irrigator along a predetermined desired forward bow which the irrigator is to assume, and controlling the valve assembly of the towers as a function of alignment and misalignment of the towers with respect to one another.

The valve assembly of each of the towers of the irrigator includes a pair of valves mounted on the irrigator at a respective one of the towers thereof; a reversing arrangement mounted on the irrigator and connected to the valves for selectively holding one of the valves closed and one of the valves open; and a linkage mounted on the irrigator and connected to the valves and to the sensor for closing the open other of the valves when the associated one of the towers moves ahead of the desired bow which the towers are to follow about their pivot.

The reversing arrangement advantageously includes a reversing lever pivotally mounted for swinging movement transversely of the pipe connecting together the towers of the irrigator. Each of a pair of springs is connected to and extends between a respective one of the associated valves and the reversing lever, with swinging movement of the reversing lever alternately closing one of the valves and opening the other. The reversing lever is preferably a T-shaped member having a leg and a pair of oppositely directed arms extending from the leg perpendicularly thereto. A winch mounted on the irrigator adjacent the center pivot has a pair of cables extending therefrom for being wound on and unwound from the winch, with each of the cables being connected to a respective one of the arms of the reversing lever for selectively swinging the lever and reversing the direction of rotation of the irrigator.

The valves each include a valve body mounted on the pipe of the irrigator at an associated one of the towers thereof, with a valve actuator being pivotally mounted on the valve body for opening and closing the valve and controlling movement of the irrigator by starting and stopping forward movement of the associated tower. A biasing arrangement in the form of a weight mounted on the valve actuator normally forces the valve actuator toward a valve open position in cooperation with the spring attached to the particular actuator and to the reversing lever when the reversing lever is positioned so as to open the particular valve and close the other of the valves. One valve is used to operate the pivot in, for example, the clockwise direction, while the other valve is used to operate the pivot in the counterclockwise direction.

The linkage includes a crank pivotally mounted on the irrigator and connected to the associated valve assembly, and a second crank pivotally mounted on the irrigator and arranged extending toward, but having a pivot spaced from, the first crank. A link is pivotally connected to the cranks and engages the sensor, which is preferably in the form of a flexible element resiliently mounted to the pivot and end tower of the irrigator, for being moved by the sensor in a substantially straight path. By this arrangement, movement of the link under force applied by the flexible element swings the first crank in such a manner as to close the one of the valves of the valve assembly which is in the open position for the particular direction of rotation of the irrigator.

A particularly advantageous feature of the invention has the second crank of the linkage formed by a first arm of a lever pivotally mounted on the irrigator, with the other of the arms of the lever having provided thereon a wind flag arranged for cancelling the effect of wind on the flexible element forming the sensor in either direction of rotation of the irrigator.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
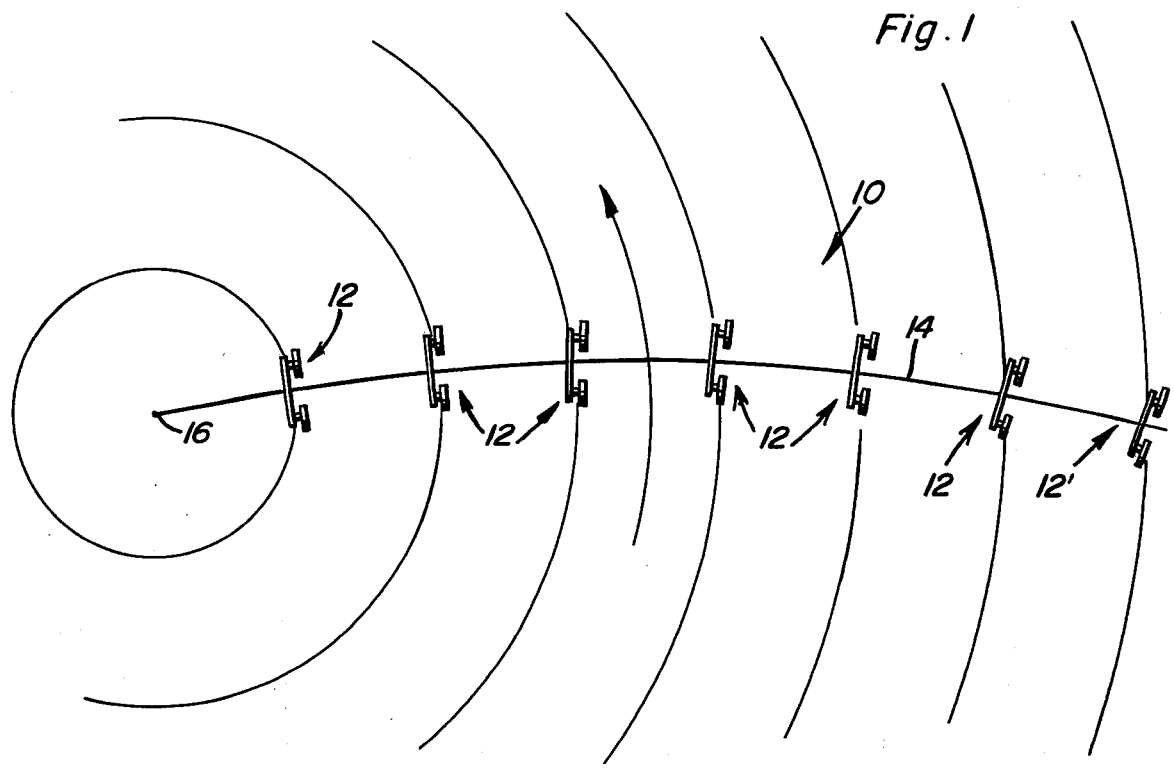
FIG. 1 is a schematic diagram showing a pivot irrigator rotating in a counterclockwise direction with a desired forward bow.

Referring now more particularly to the Figures of the drawings, FIG. 1 illustrates the slight forward bow of an irrigator 10 which the towers 12 and end tower 12' are to follow in order to cause the pipe 14 connecting together the towers 12 and 12' to be in tension on its leading side. When the direction of rotation of the pivot is reversed, this same forward bow should be established in the opposite direction. Note how the outer towers 12, 12' attempt to make a bigger circle when the proper bow is established.

Figure 2:
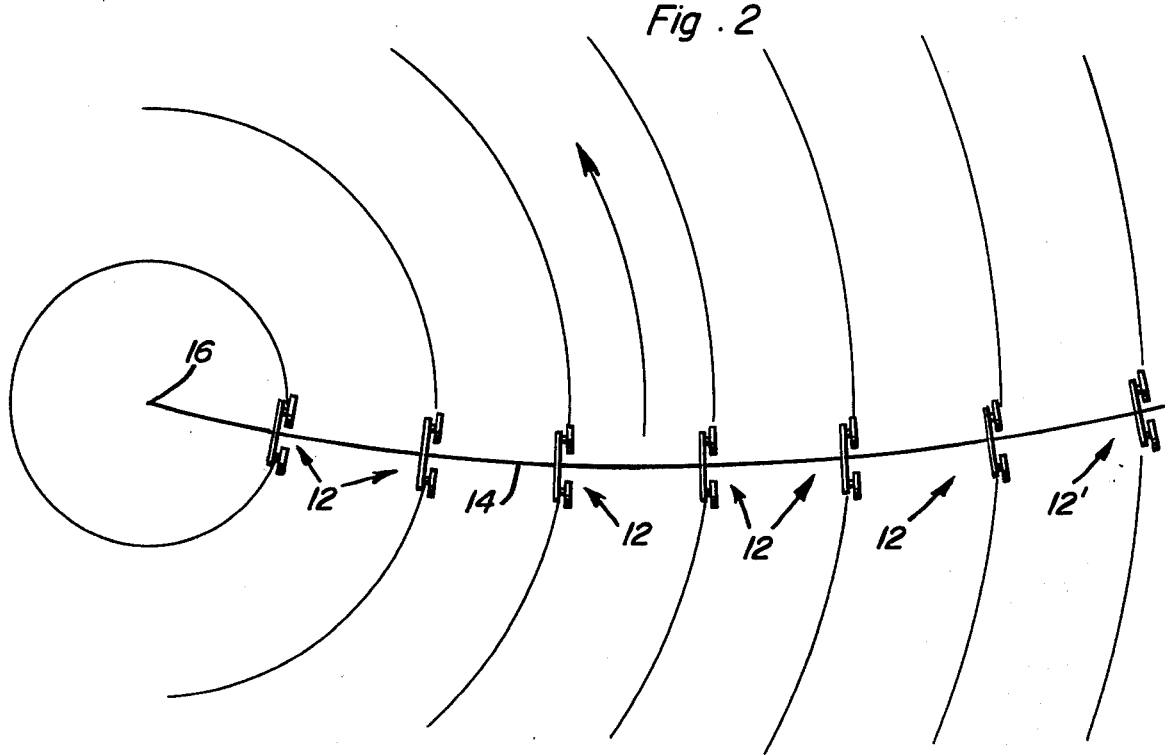
FIG. 2 is a schematic diagram similar to FIG. 1, but showing the pivot irrigator rotating in a counterclockwise direction with an undesirable reverse bow.

FIG. 2 illustrates an irrigator operating with a reverse bow. As can be seen from the Figure, such a reverse bow will cause compression of pipe 14 as it rotates about pivot point 16, and subsequent damage to the machine is certain to result. Note how the outer towers 12, 12' attempt to cut in toward pivot point 16 and make a smaller circle as the towers 12, 12' rotate.

Figure 3:
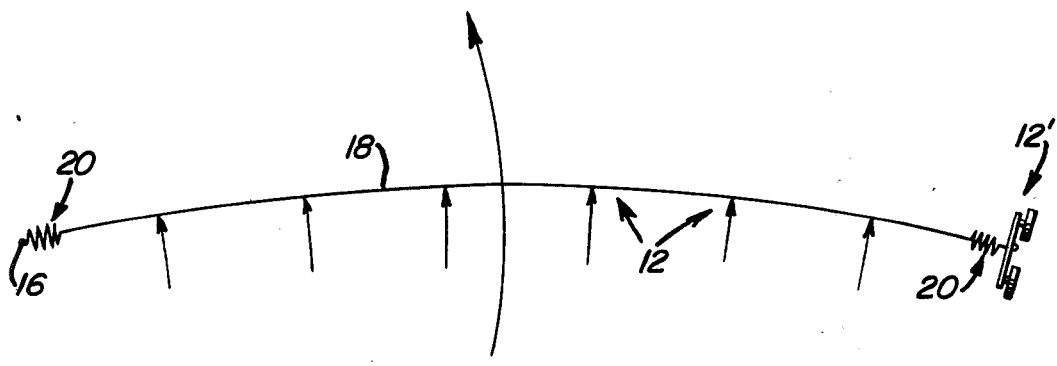
FIG. 3 is a schematic diagram showing a sensing arrangement according to the present invention for keeping the towers of a pivot irrigator in desired forward bow alignment with one another.

As can be seen from FIG. 3 of the drawings, when an automatic forward bow alignment system according to the present invention is employed, a sensor arrangement in the form of a wire 18 or other suitable flexible element is tightly stretched between the pivot point 16 and end tower 12' as by springs 20 employed to maintain proper tension on wire 18. The latter is attached to a linkage at each of the remaining towers 12, which linkage will be described in detail below. The towers 12 are illustrated as direction arrows in FIG. 3 in order to emphasize that each of the towers 12 pushes on wire 18 in the direction that irrigator 10 is rotating. That direction is counterclockwise as seen in FIG. 3.

Figure 4:
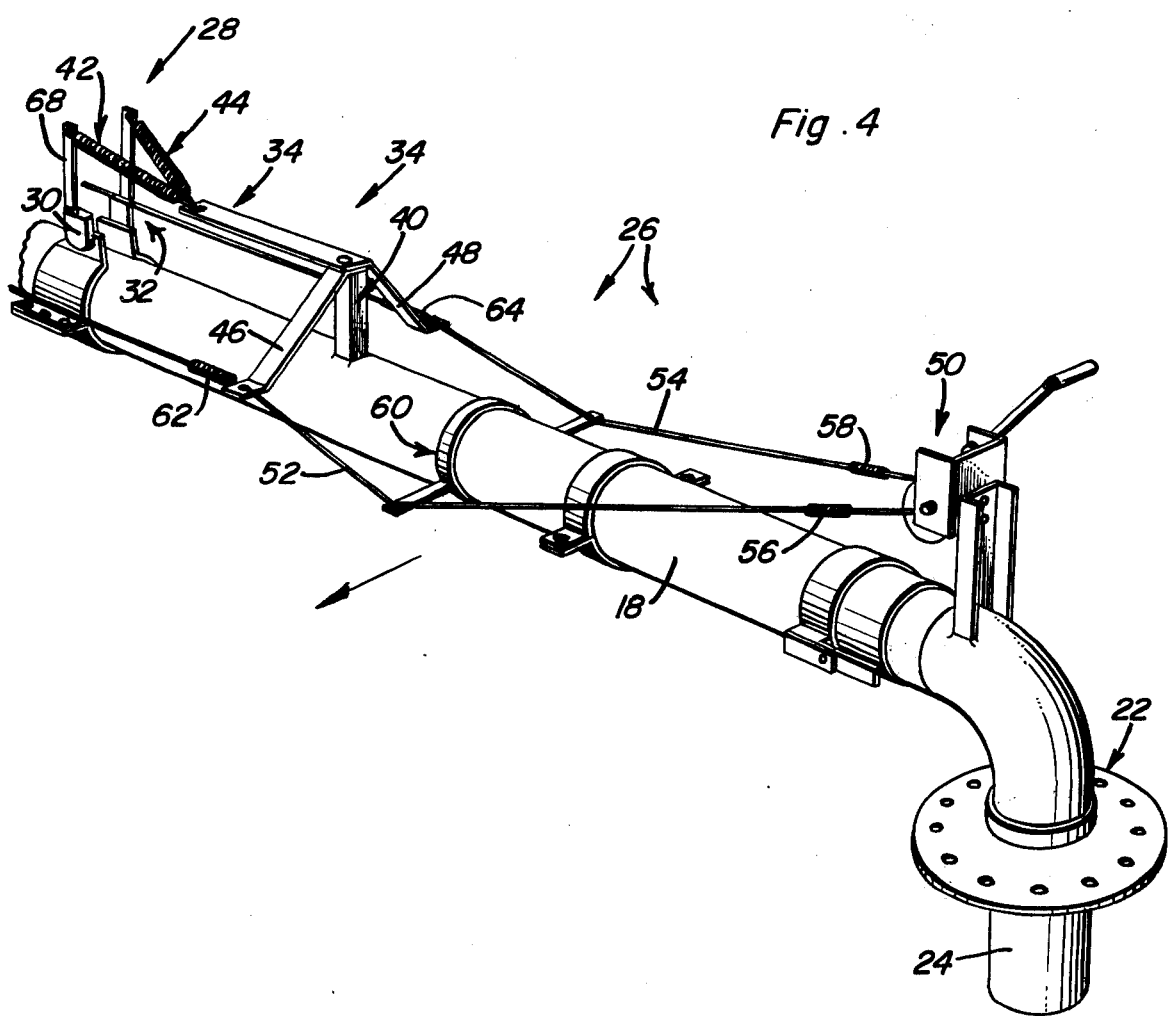
FIG. 4 is a fragmentary, perspective view showing a portion of an automatic forward bow alignment system according to the present invention.
Figure 5:
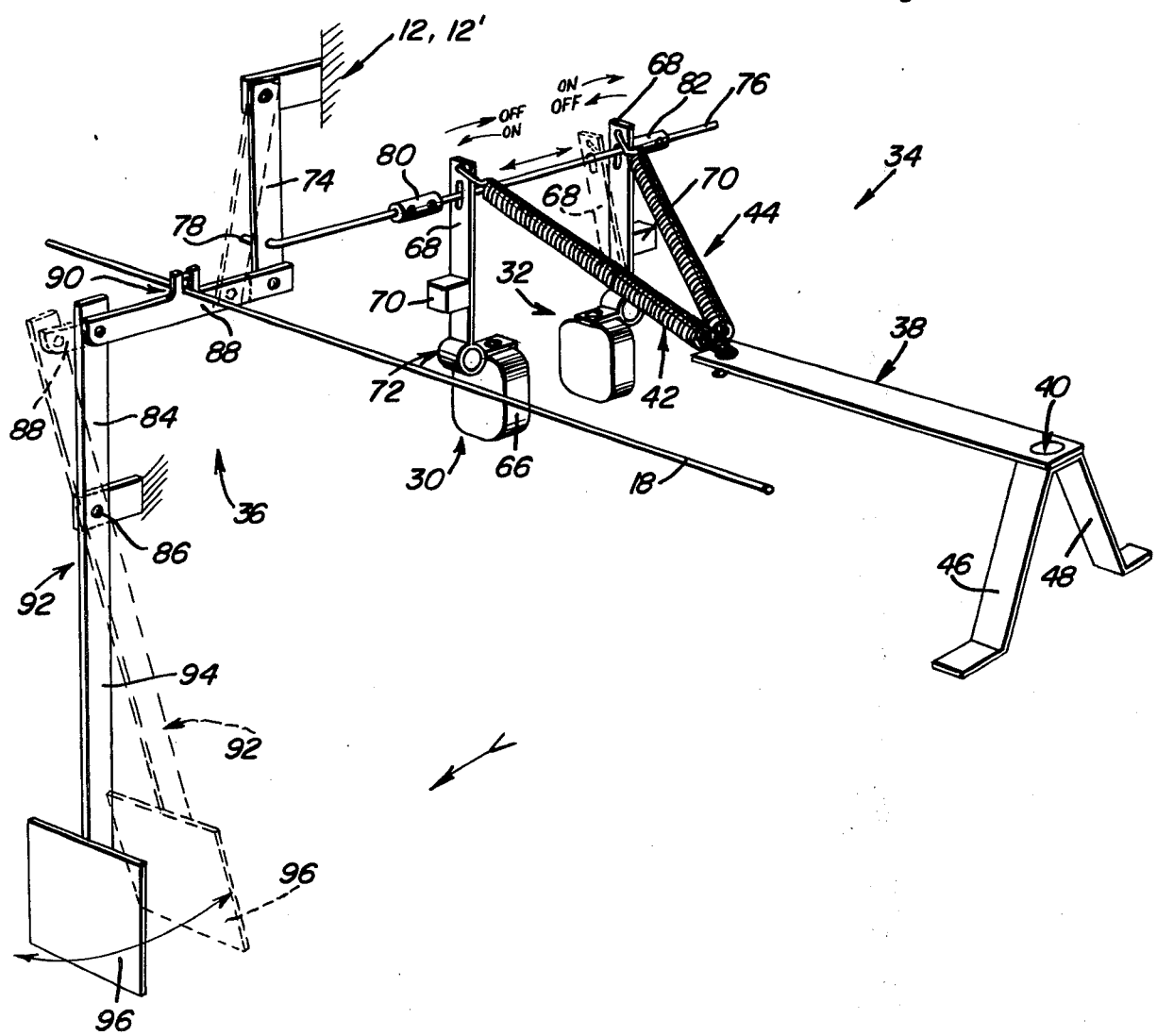
FIG. 5 is a schematic, fragmentary, perspective view showing the basic elements of an automatic forward bow alignment system according to the present invention.

Referring now more particularly to FIGS. 4 and 5 of the drawings, the self-propelled irrigator 10 comprises the aforementioned elongated water-distributing pipe 14 pivotally mounted at one end 22 and in engagement with a water supply carried through conduit 24 which forms a pivot axis corresponding to pivot point 16 as seen in FIGS. 1 and 2. Pipe 14 is supported throughout the length thereof by the aforementioned plurality of mobile support towers 12 and 12' selectively propelled in a known manner by water-powered motors (not shown), the operation of which motors is generally regulated by a suitable control valve. Attention is directed to my U.S. Pat. No. 4,080,991 issued Mar. 28, 1978. Mounted on pipe 14 at each tower 12, 12', not shown in FIGS. 4 and 5, is a system 26 according to the present invention for automatic forward bow alignment of the irrigator 10. This system 26 includes a valve assembly 28 associated with each of the towers 12, 12' of irrigator 10 for regulating movement of the towers 12, 12' in a direction of rotation of irrigator 10 in order to maintain the desired forward bow.

The valve assembly 28 includes a pair of valves mounted on pipe 14 as by the illustrated clamp and connected to the drive motors (not shown) of the respective tower 12, 12' in a suitable manner, not shown but known per se, for controlling the forward movement of the associated tower 12, 12'. A reversing arrangement 34 is mounted on pipe 14 adjacent the associated valve assembly 28 at a tower 12, 12' and is connected to the valves 30, 32 for selectively holding one of the valves closed and the other of the valves open so as to obtain a desired direction of rotation of irrigator 10. Mounted on irrigator 10, preferably to tower structure not shown in detail, and connected to valves 30 and 32 and to wire 18 is a linkage 36 which functions to selectively close the open other of the valves 30, 32 when the associated tower 12 moves ahead of its proper position in the desired forward bow.

Reversing arrangement 34 includes a reversing lever 38 pivotally mounted as at pivot 40 on pipe 14 for swinging movement transversely of the pipe 14. A pair of coiled tension springs 42 and 44 are connected to and extend between a respective one of the valves 30, 32 and the reversing lever 38, such that swinging movement of reversing lever 38 alternately closes one of the valves and opens the other. Reversing lever 38 is a generally T-shaped member having a leg extending between pivot 40 and a point of attachment of springs 42 and 44, and a pair of oppositely directed arms 46 and 48 extending perpendicularly from the leg adjacent pivot 40.

A winch 50 is mounted on irrigator 10 adjacent the pivot axis thereof, and has attached thereto a pair of cables 52 and 54 arranged for being wound on and unwound from winch 50. Since the latter is of conventional construction it will not be described in detail herein. Each of the cables 52 and 54 is connected to a length of cable on winch 50 as by the illustrated coiled tension springs 56 and 58, extends through guides provided on oppositely directed bars of a guide bracket 60 and is connected to a respective one of the arms 46, 48 of reversing lever 38. Coiled tension springs 62 and 64 connect a further extent of the cables 52, 54 to the arms 46, 48 for connecting additional reversing arrangements 34 to winch 50 and permitting all of the valve assemblies 28 to be reversed simultaneously so that all of the towers 12 and 12' of irrigator 10 will rotate in the same direction, either clockwise or counterclockwise.

Valves 30, 32 each include a valve body 66 mounted on pipe 14 as by the aforementioned clamp at an associated one of the towers 12, 12'. A valve actuator 68 is pivotally mounted on valve body 66 for opening and closing the associated valve 30, 32 in a known manner not described in detail herein and controlling movement of irrigator 10. A biasing device preferably in the form of the illustrated weight 70 mounted on the planar element forming actuator 68 is provided for cooperating with an associated one of the springs 42, 44 in order to hold the valve 30, 32 in an open position. When the associated one of the springs 42, 44 is disposed so as to place the valve 30, 32 in a closed position, the bias of weight 70 will be overcome and the actuator 68 will be permitted to swing about its associated hinge 72 so as to close the valve 30, 32.

As is indicated on FIG. 5, valve 30 is open when its associated actuator 68 is moved to the left as seen in the Figure, while valve 32 is on when its actuator 68 is moved to the right. Thus, in FIG. 5 valve 32 is open and valve 30 is closed.

Linkage 36 includes a crank 74 pivotally mounted on irrigator 10, as to a portion of an associated tower 12, 12', and is connected to the valves 30, 32 as by a rod 76 terminating at one end with a hook 78 arranged in an aperture provided in crank 74 and having affixed along the length thereof collars 80 and 82. As can be seen from FIG. 5, the collars 80, 82 are disposed on either side of the actuator 68 of valves 30 and 32 and pass through the planar members forming the actuator 68 as by suitable slots provided therein. Thus, reciprocating movement of rod 76, as indicated by the double arrow in FIG. 5, will engage the actuator 68 of the one of the valves 30, 32 which is open, namely 32 as shown in FIG. 5, and move that actuator 68 to a position closing the valve, as shown by broken lines for actuator 68 of valve 32. A further crank 84 is pivotally mounted on irrigator 10 and is arranged extending toward, but having a pivot 86 spaced from, crank 74. A link 88 is pivotally connected to cranks 74 and 84 and engages wire 18 for being moved thereby in a substantially straight path. Movement of link 88 under a force exerted thereon by wire 18 will swing crank 74, and thus rod 76, and cause one of the collars 80, 82 to close the open valve 30, 32. A guide 90 is arranged projecting from the longitudinal extent of link 88 so as to form an eye in which wire 18 can be slidably and removably disposed.

A lever 92 pivotally mounted on irrigator 10 as at the pivot 86 and having a pair of oppositely directed arms preferably forms crank 84 by one of the arms of the lever 92, while the other arm 94 of lever 92 has a wind flag 96 arranged thereon for cancelling the effect of wind on wire 18 in either direction of rotation of irrigator 10. That is, when flag 96 moves lever 92 as shown in FIG. 5, the direction of rotation of the irrigator 10 being shown by the direction arrow in FIG. 5, link 88 will be shifted in the direction of movement of the irrigator 10 in order to compensate for the force of wind on the longitudinal extent of wire 18.

OPERATION

The appropriate valve 32, 30 which will cause the motors (not shown) propelling towers 12, 12' in either the counterclockwise or clockwise direction is biased in the on position by the associated one of the springs 44, 42 and by the weight 70 provided on the associated valve actuator 68. All the towers 12 will push with a few grams of force horizontally against wire 18 in the forward direction of movement of irrigator 10. When the wire 18 pushes back with a force equal to the bias on valve actuator 68, the actuator 68 will move to a position closing the associated valve 32, 30 and the particular tower 12 on which the valve 32 is mounted will stop advancing. This sequence of events takes place for each of the towers between the pivot axis 16 and the end tower 12'. The result is that all the towers 12 are applying a bias to wire 18 in the forward direction. By proper arrangement of the various linkages 36 associated with each of the towers 12, the wire 18 will bow ahead automatically as shown in FIG. 3.

More specifically, one of the springs 42, 44 holds the associated valve 30, 32 in the off position while the other spring 44, 42 provides a bias on the actuator 68 of the other valve 32, 30 which biases the valve 32, 30 into the on position and feeds through linkage 36 to push forward on control wire 18. When the associated tower 12 advances far enough ahead, the wire 18 starts to pull back on the actuator 68 of the open valve 32, 30 against the bias of the spring 44, 42, and the weight 70, the valve 32, 30 will be closed, and the tower 12 will then stop. The result is that all the towers 12 are applying a bias to wire 18 in the forward direction and, thus, a forward bow is automatically established which will not be excessive in amount. The central towers 12 along the extent of pipe 14 will come of course, to be set up to move at a slightly faster rate of speed than the end tower 12'.

As can be readily understood from the above description and from the drawings, the present invention provides a system for automatic forward bow alignment of a pivot irrigator in a simple, yet reliable manner. The system can be easily installed even on existing units, and eliminates the necessity of an operator (not shown) having to wear a rain suit to make customary tower-by-tower alignment adjustments as are necessary with known equipment. The system is easy to maintain, and if one of the valves 30, 32 is ever disassembled for repair or cleaning, realignment of the valve is not required after it is repaired. Further, immediate reversal of a water drive pivot from the pivot point 16 is realized by the invention. Most water drive pivots require the operator to make adjustments at each tower to reverse the system.

Other advantages realized by the invention include inherent icing protection. When pivots are operated at temperatures below, for example, 38 degrees F. (3.33 degrees celsius) evaporation cools the surrounding air and the resulting mist can freeze on the components of the system. This ice will continue to accumulate until the weight of the ice will crush the system. The alignment system according to the invention, however, will not function with ice on it, so that the pivot will be caused to go out of alignment and the safety system (not shown) provided on the irrigator will shut down the entire device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A system for automatic forward bow alignment on a pivot irrigator including a center pivot, a plurality of towers spaced radially from the center pivot, and a pipe extending from the center pivot and connected to each of the towers, the system comprising, in combination:

(a) valve means associated with each of the towers of the irrigator for regulating movement of the tower in a direction of rotation of the irrigator; and (b) sensor means for detecting alignment of each of the towers along the desired forward bow of the irrigator and controlling the valve means of each of the towers as a function of alignment and misalignment of a one of the towers with the other of the towers along the curve of the desired forward bow, the valve means of each of the towers includes, in combination:
(1) a pair of valves mounted on the irrigator at a respective one of the towers;
(2) reversing means mounted on the irrigator and connected to the valves for selectively holding one of the valves closed; and
(3) linkage means mounted on the irrigator and connected to the valves and to the sensor means for closing the open other of the valves when the one of the towers moves ahead of the desired forward bow, the reversing means including, in combination:
(4) a reversing lever pivotally mounted for swinging movement transversely of the pipe; and
(5) a pair of springs, with each of the springs of the pair of springs being connected to and arranged extending between a respective one of the associated pair of valves and the reversing lever, for swinging movement of the reversing lever alternately closing one of the valves and opening the other of the valves of the associated pair of valves.

2. A structure as defined in claim 1, wherein the sensor means includes a longitudinally extending flexible element resiliently mounted on and arranged extending substantially parallel to the pipe between the center pivot and an end tower of the irrigator.

3. A structure as defined in claim 1, wherein the reversing lever is a T-shaped member having a leg and a pair of oppositely directed arms extending perpendicularly from the leg, and the reversing means further including:
(6) a winch mounted on the irrigator at the center pivot thereof; and
(7) a pair of cables extending from the winch for being wound or unwound from the winch, each of the cables being connected to a respective one of the arms of the reversing lever for selectively swinging the lever and reversing the direction of rotation of the irrigator, the cables being connected to respective one of the arms of a reversing lever associated with each of the towers.

4. A structure as defined in claim 1, wherein the valves each include:
(8) a valve body mounted on the pipe in an associated one of the towers;
(9) a valve actuator pivotally mounted on the valve body for opening and closing the valve and controlling movement of an associated tower of the irrigator; and
(10) biasing means associated with the valve actuator for normally forcing the valve actuator toward a valve open position, the valve actuator being connected to a respective one of the springs of the reversing lever and disposed for selective engagement by the linkage means in movement to a valve closed position by the linkage means.

5. A structure as defined in claim 4, wherein the biasing means includes a weight mounted on the valve actuator.

6. A structure as defined in claim 4, wherein the linkage means includes:
(11) a first crank pivotally mounted on the irrigator and connected to the associated valve actuator;
(12) a second crank pivotally mounted on the irrigator and arranged extending toward, but having a pivot spaced from, the first crank; and
(13) a link pivotally connected to the first crank and second crank and to the sensor means for being moved by the sensor means in a substantially straight line path, with movement of the link swinging the first crank and operating on the valve actuator of the opened valve.

7. A structure as defined in claim 6, wherein the linkage means further includes a lever pivotally mounted on the irrigator and having a pair of oppositely directed arms, one of the arms being the second crank and further including a wind flag mounted on the other of the arms, the wind flag being arranged for cancelling the effect of wind on the flexible element of the sensor means.

8. A structure as defined in claim 1, wherein the pair of valves each includes:
(1) a valve body mounted on the pipe at an associated one of the towers of the irrigator;
(2) a valve actuator pivotally mounted on the valve body for opening and closing the valve and controlling movement of the irrigator; and
(3) biasing means associated with the valve actuator for forcing the valve actuator toward one of a valve open position and a valve close position depending on the direction of rotation of the irrigator.

9. A structure as defined in claim 8, wherein the biasing means includes a weight mounted on the valve actuator.

10. A structure as defined in claim 1, wherein the valve means includes linkage means comprising:
(1) a first crank pivotally mounted on the irrigator and connected to the valve means;
(2) a second crank pivotally mounted on the irrigator and arranged extending toward, but having a pivot spaced from, the first crank; and
(3) a link pivotally connected to the first crank and second crank and to the sensor means for being moved by the sensor means in a substantially straight line path, with movement of the link swinging the first crank and causing the valve means to stop movement of an associated one of the towers of the irrigator.

11. A structure as defined in claim 10, wherein the linkage means further includes a lever pivotally mounted on the irrigator and having a pair of oppositely directed arms, one of the arms being the second crank and further including a wind flag mounted on the other of the arms, the wind flag being arranged for cancelling the effect of wind on the flexible element of the sensor means.

12. In a self-propelled irrigator including a plurality of towers connected to a pivotally mounted pipe, and an arrangement for controlling the speed of the towers, the improvement wherein the arrangement for controlling is an automatic forward bow alignment system comprising, in combination:
(a) valve means associated with each of the towers of the irrigator for regulating movement of the towers in a direction of rotation of the irrigator;
(b) sensor means for detecting alignment of each of the towers along a desired forward bow of the irrigator and controlling the valve means of the towers as a function of alignment and misalignment of the towers relative to one another along the desired forward bow, the sensor means including a longitudinally extending flexible member resiliently mounted on and arranged extending substantially parallel to the pipe between the center pivot and an end one of the towers, with the valve means including a pair of valves mounted on the irrigator for controlling forward movement of an associated one of the towers, reversing means mounted on the irrigator and connected to the valves for selectively holding one of the valves closed, and linkage means also mounted on the irrigator and connected to the valves and to the flexible element for closing an open one of the valves when the associated one of the towers moves ahead of the desired forward bow of the towers, the reversing means, including, in combination:

(1) a reversing lever pivotally mounted for swinging movement transversely of the pipe; and (2) a pair of springs, with each of the springs of the pair of springs being connected to and arranged extending between a respective one of the associated pair of valves and the reversing lever, for swinging movement of the reversing lever alternately closing one of the valves and opening the other of the valves of the associated pair of valves.

* * * * *